(12) United States Patent
Guan et al.

(10) Patent No.: US 10,873,417 B2
(45) Date of Patent: *Dec. 22, 2020

(54) INFORMATION SENDING METHOD, INFORMATION RECEIVING METHOD, AND DEVICE

(71) Applicant: Huawei Technologies Co., Ltd., Shenzhen (CN)

(72) Inventors: Lei Guan, Beijing (CN); Yongxia Lyu, Ottawa (CA); Zhiyu Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,251

(22) Filed: Nov. 14, 2019

(65) Prior Publication Data

US 2020/0083981 A1    Mar. 12, 2020

Related U.S. Application Data

(63) Continuation of application No. 15/895,896, filed on Feb. 13, 2018, now Pat. No. 10,498,483, which is a (Continued)

(51) Int. Cl.
    *H04L 1/00*      (2006.01)
    *H04L 1/18*      (2006.01)
    (Continued)

(52) U.S. Cl.
    CPC ............ *H04L 1/0026* (2013.01); *H04L 1/18* (2013.01); *H04L 1/1864* (2013.01);
    (Continued)

(58) Field of Classification Search
    CPC ... H04L 1/0026; H04L 1/1864; H04L 5/0055; H04L 1/18; H04L 1/1887; H04L 1/1812;
    (Continued)

(56) References Cited

U.S. PATENT DOCUMENTS 8,593,936 B2    11/2013    Ko et al.
2011/0243066 A1*    10/2011    Nayeb Nazar ........ H04L 1/0057
                                                                  370/328

(Continued)

FOREIGN PATENT DOCUMENTS

CN      101789851 A      7/2010
CN      101951684 A      1/2011
(Continued)

OTHER PUBLICATIONS

"HARQ-ACK Feedback for CA with up to 32 CCs," 3GPP TSG RAN WG1 #81, Fukuoka, Japan, R1-152625, pp. 1-5, 3rd Generation Partnership Project, Valbonne, France (May 25-29, 2015).
(Continued)

*Primary Examiner* — Afshawn M Towfighi
(74) *Attorney, Agent, or Firm* — Leydig, Voit & Mayer, Ltd.

(57) ABSTRACT

Information sending methods and devices are described. In examples of the present disclosure, a network device may schedule a first downlink subframe in a downlink subframe set of a terminal. The network device then a sum field and a first indication field to the terminal. The network device first feedback information in an uplink subframe for the first downlink subframe in the downlink subframe set.

18 Claims, 3 Drawing Sheets

A terminal determines to send feedback information for a downlink subframe to a network device in a first feedback manner, where in the first feedback manner, a first codebook of the feedback information is corresponding to a downlink subframe in an instantly scheduled downlink subframe set, the instantly scheduled downlink subframe set includes the downlink subframe of the terminal that is actually scheduled by the network device, and the terminal is a terminal supporting CA — 101

The terminal sends the feedback information to the network device in the first feedback manner — 102

Related U.S. Application Data continuation of application No. PCT/CN2015/086970, filed on Aug. 14, 2015.

(51) Int. Cl.
  *H04W 72/04* (2009.01)
  *H04L 5/00* (2006.01)
  *H04W 72/12* (2009.01)

(52) U.S. Cl.
  CPC ........... *H04L 5/0055* (2013.01); *H04W 72/04* (2013.01); *H04W 72/042* (2013.01); *H04W 72/1273* (2013.01); *H04L 1/1812* (2013.01); *H04L 1/1887* (2013.01); *H04W 72/0446* (2013.01)

(58) Field of Classification Search
  CPC ........... H04W 72/1273; H04W 72/042; H04W 72/04; H04W 72/0446
  See application file for complete search history.

(56) References Cited

U.S. PATENT DOCUMENTS

| | | |
|---|---|---|
| 2012/0039279 A1 | 2/2012 | Chen et al. |
| 2012/0039280 A1 | 2/2012 | Chen et al. |
| 2012/0176991 A1 | 7/2012 | Chen et al. |
| 2012/0320805 A1* | 12/2012 | Yang ............... H04L 1/1861 370/280 |
| 2014/0044025 A1 | 2/2014 | Li et al. |
| 2015/0181588 A1 | 6/2015 | Song et al. |
| 2015/0215078 A1 | 7/2015 | Chen et al. |
| 2018/0132265 A1 | 5/2018 | Guan et al. |

FOREIGN PATENT DOCUMENTS

| | | |
|---|---|---|
| CN | 103119884 A | 5/2013 |
| CN | 103580831 A | 2/2014 |
| CN | 104272689 A | 1/2015 |
| CN | 104798429 A | 7/2015 |
| EP | 2469748 A1 | 6/2012 |
| WO | 2015080140 A1 | 6/2015 |

OTHER PUBLICATIONS

"Dynamic adaptation of HARQ-ACK feedback size and PUCCH format," 3GPP TSG-RAN WG1 Meeting #81, R1-152810, pp. 1-4, 3rd Generation Partnership Project, Valbonne, France (May 25-29, 2015).

U.S. Appl. No. 15/895,826, filed Feb. 13, 2018.

"Draft Report of 3GPP TSG RAN WG1 #67 v0.1.0, (San Francisco, USA, Nov. 14-18, 2011)," 3GPP TSG RAN WG1 Meeting #68, Dresden, Germany, R1-12xxxx, total 86 pages, 3rd Generation Partnership Project, Valbonne France (Feb. 6-10, 2012).

"LTE; Evolved Universal Terrestrial Radio Access (E-UTRA); User Equipment (UE) radio transmission and reception (3GPP TS 36.101 version 8.26.0 Release 8)," ETSI TS 136 101 V8.26.0, 3GPP TS 36.101 RAN 4 Release 8, total 170 pages (Feb. 2015).

\* cited by examiner

First indication field (UL_DAI)=1

US 10,873,417 B2

INFORMATION SENDING METHOD, INFORMATION RECEIVING METHOD, AND DEVICE

CROSS-REFERENCE TO RELATED APPLICATIONS

This application is a continuation of U.S. patent application Ser. No. 15/895,826, filed on Feb. 13, 2018, which is a continuation of International Application No. PCT/CN2015/086970, filed on Aug. 14, 2015, the disclosures of which are hereby incorporated by reference in their entirety.

TECHNICAL FIELD

The present disclosure relates to the field of mobile communications technologies, and in particular, to an information sending method, an information receiving method, and a device.

BACKGROUND

In Long Term Evolution (LTE), a hybrid automatic repeat request (HARQ) mechanism is used. Downlink transmission is used as an example. After a user equipment (UE) receives information carried on a physical downlink shared channel (PDSCH) in a downlink subframe, if the information is correctly received, the UE feeds back an acknowledgement (ACK) on a physical uplink control channel (PUCCH) in a corresponding uplink subframe; or if the information is not correctly received, the UE feeds back a negative acknowledgement (NACK) on a PUCCH in a corresponding uplink subframe. If no Physical Uplink Shared Channel (PUSCH) transmission is performed, the ACK/NACK is sent on the PUCCH. Once PUSCH transmission is performed, the ACK/NACK needs to be sent on a PUSCH, and the PUSCH is scheduled by using a PDCCH that is sent by a network.

LTE further supports a carrier aggregation (CA) technology. That is, a base station configures a plurality of carriers for one UE to improve a data rate of the UE.

In existing CA, the UE usually generates, according to a preconfigured carrier set and/or a preconfigured subframe set, an ACK/NACK corresponding to a downlink subframe on each corresponding carrier. For example, one UE aggregates five carriers, and downlink subframes that are preconfigured for the UE are downlink subframes that are corresponding to a current time division duplex (TDD) uplink-downlink configuration of a corresponding carrier in the five carriers. For example, if 20 downlink subframes are preconfigured for the UE, the UE needs to feedback 20 ACKs/NACKs.

With further evolution of LTE technologies, more carriers may be configured for the UE in the future. In one feedback manner, the UE needs to support feedback of an ACK/NACK with a larger quantity of bits, for example, far greater than 22 bits. This is a maximum quantity of ACK/NACK bits supported in current CA of five carriers. However, though the base station configures many carriers for the UE, a quantity of downlink subframes that are actually scheduled by the base station may be far less than a quantity of downlink subframes included in the carriers configured for the UE. For example, the base station may configure 32 carriers for the UE, and the base station can schedule, for example, 128 downlink subframes according to a TDD uplink-downlink configuration of each carrier. However, the base station may actually schedule only 20 downlink subframes. In one manner, the UE still needs to feed back ACKs/NACKs corresponding to the 128 downlink subframes to the base station, resulting in relatively high system overheads.

SUMMARY

Examples of the present disclosure provide an information sending method, and a device.

According to a first aspect, an information sending method is provided. The method may include: determining, by a terminal, feedback information to be sent for a downlink subframe to a network device in a first feedback manner, where, in the first feedback manner, a first codebook of the feedback information corresponds to a downlink subframe in an instantly scheduled downlink subframe set, where the instantly scheduled downlink subframe set comprises the downlink subframe to be received by the terminal that is scheduled to be transmitted by the network device, and the terminal supports carrier aggregation (CA); and sending, by the terminal, the feedback information to the network device in the first feedback manner.

According to a second aspect, a terminal is provided. The terminal may include a processor, configured to determine feedback information to be sent for a downlink subframe to a network device in a first feedback manner, where, in the first feedback manner, a first codebook of the feedback information corresponds to a downlink subframe in an instantly scheduled downlink subframe set, where the instantly scheduled downlink subframe set comprises the downlink subframe to be received by the terminal that is scheduled by the network device, and the terminal supports carrier aggregation (CA); and a transmitter, configured to send the feedback information to the network device in the first feedback manner.

It is to be understood that both the foregoing general description and the following detailed description are exemplary only and are not restrictive of the present disclosure.

DETAILED DESCRIPTION

Figure 1:
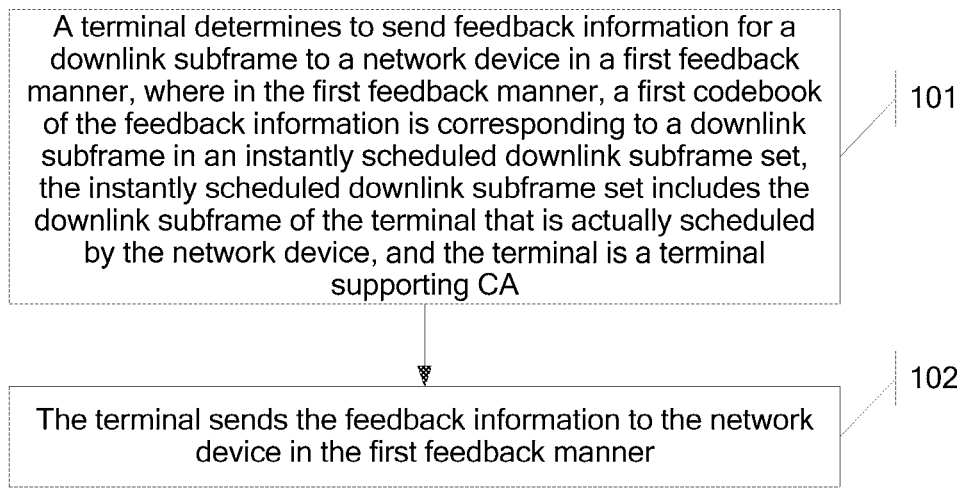
FIG. 1 is a flowchart of an information sending method according to an example of the present disclosure.

To make the objectives, technical solutions, and advantages of the examples of the present disclosure clearer, the following clearly describes the technical solutions in the examples of the present disclosure with reference to the accompanying drawings in the examples of the present disclosure. Apparently, the described examples are some but not all of the examples of the present disclosure. All other examples obtained by a person of ordinary skill in the art based on the examples of the present disclosure without creative efforts shall fall within the protection scope of the present disclosure.

The following describes some terms in the examples of the present disclosure to facilitate understanding by a person skilled in the art.

(1) A terminal is a device that provides voice and/or data connectivity for a user. For example, the terminal may be a handheld device with a wireless connection function, or a processing device connected to a wireless modem. The terminal may communicate with a core network by using a radio access network (RAN), and exchange voice and/or data with the RAN. The terminal may be referred to as UE user equipment, a wireless terminal, a mobile terminal, a subscriber unit, a subscriber station, a mobile station, a mobile console (Mobile), a remote station, an access point (AP), a remote terminal, an access terminal, a user terminal, a user agent, a user device or the like. For example, the terminal may be a mobile phone (or referred to as a "cellular" phone), a computer with a mobile terminal, or a portable, pocket-sized, handheld, computer built-in, or in-vehicle mobile apparatus, such as a personal communications service (PCS) phone, a cordless telephone set, a Session Initiation Protocol (SIP) phone, a wireless local loop (WLL) station, or a personal digital assistant (PDA).

(2) A base station (for example, an access point) may be a device that communicates with a wireless terminal by using one or more sectors over an air interface in an access network. The base station may be configured to perform conversion between a received over-the-air frame and an IP packet, and serve as a router between the wireless terminal and a remaining part of the access network. The remaining part of the access network may include an Internet Protocol (IP) network. The base station may further coordinate attribute management of the air interface. For example, the base station may be an evolved NodeB (NodeB or eNB or e-NodeB,) in LTE-A. This is not limited in the examples of the present disclosure.

(3) The terms "system" and "network" in the examples of the present disclosure may be used interchangeably. The term "a plurality of" refers to two or more than two. The term "and/or" is an associative relationship for describing associated objects and indicates that three relationships may exist. For example, A and/or B may represent the following three cases: Only A exists, both A and B exist, and only B exists. In addition, the character "/" generally indicates an "or" relationship between associated objects unless specified otherwise.

The background of the examples of the present disclosure is first described.

In an LTE system, service transmission is performed based on scheduling by a base station. A basic time unit of the scheduling is one subframe, and one subframe includes a plurality of time domain symbols. A specific scheduling procedure is as follows: The base station sends a control channel, for example, a Physical Downlink Control Channel (PDCCH) or an Enhanced PDCCH (EPDCCH), where the control channel sent by the base station may carry scheduling information of a PDSCH or a PUSCH, and the scheduling information includes control information such as resource allocation information and a modulation and coding scheme. UE detects the control channel in a subframe, and receives a downlink data channel or sends an uplink data channel according to the scheduling information carried on the detected control channel.

LTE supports two duplex modes: frequency division duplex (FDD) and TDD. In an FDD system, uplink transmission and downlink transmission are performed on different carriers. In a TDD system, uplink transmission and downlink transmission are performed on a same carrier at different time. Specifically, one carrier includes a downlink subframe, an uplink subframe, and a special subframe. The special subframe includes three parts: a downlink pilot timeslot (DwPTS), a guard period (GP), and an Uplink Pilot Time Slot (UpPTS for uplink pilot timeslot). The GP is mainly used to compensate a downlink-uplink component switching time and a propagation delay. In addition, downlink data may be transmitted in the DwPTS, but a PUSCH cannot be transmitted in the UpPTS. Therefore, in this perspective, the special subframe may also be considered as a downlink subframe. LTE currently supports seven different TDD uplink-downlink configurations. As shown in Table 1, D represents a downlink subframe, S represents a special subframe, and U represents an uplink subframe.

TABLE 1

TDD uplink-downlink configuration in the LTE system

| Uplink-downlink configuration | Downlink-to-uplink switching period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A HARQ mechanism is used in the LTE system. Downlink transmission is used as an example. After the UE receives a PDSCH, if the PDSCH is correctly received, the UE feeds back an ACK on a PUCCH; or if the PDSCH is not correctly received, the UE feeds back a NACK on the PUCCH. In FDD, after receiving the PDSCH in a subframe n−4, the UE feeds back the ACK/NACK in a subframe n. In TDD, a time sequence relationship between a PDSCH received by the UE and a corresponding ACK/NACK fed back by the UE is shown in Table 2. In Table 2, a subframe with a digit is an uplink subframe n used for feeding back an ACK/NACK, and the digit indicates that an ACK/NACK corresponding to a PDSCH in a downlink subframe set n−k (k belongs to K) needs to be fed back in the uplink subframe n. For example, when K={7, 6} in a subframe 2 with an uplink-downlink configuration 1, the uplink subframe 2 is used to feed back ACKs/NACKs corresponding to PDSCHs in two downlink subframes n−7 and n−6. In this case, the downlink subframe n−7 is a downlink subframe 5, and the downlink subframe n−6 is a downlink subframe 6. If no PUSCH transmission is performed, an ACK/NACK is sent on a PUCCH. Once PUSCH transmission is performed, the ACK/NACK needs to be sent on a PUSCH, and the PUSCH is scheduled by using a PDCCH that is sent by a network.

TABLE 2

Time sequence relationship between a PDSCH and an ACK/NACK corresponding to the PDSCH in the TDD system

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

LTE further supports a CA technology, that is, the base station configures a plurality of carriers for one UE to improve a data rate of the UE. When CA is performed, the plurality of carriers are simultaneously sent by the base station in terms of time, and the UE may separately detect a PDCCH and a corresponding PDSCH for scheduling each carrier. A specific detection process of each carrier is similar to the foregoing single carrier case.

The LTE system supports FDD CA, TDD CA, and FDD+TDD CA. TDD CA is further classified into TDD CA with a same uplink-downlink configuration and TDD CA with different uplink-downlink configurations. LTE in a current release can support carrier aggregation of a maximum of five carriers. In a CA mode, one primary component carrier and at least one secondary component carrier are included, and a PUCCH carrying an ACK/NACK is sent only on the primary component carrier of the UE. In addition, if a PUSCH is scheduled for the UE in an uplink subframe in which an ACK/NACK needs to be fed back, the ACK/NACK needs to be carried on the PUSCH, instead of a PUCCH.

In existing CA, an ACK/NACK codebook is generated according to a preconfigured carrier set and/or a preconfigured subframe set. For example, a TDD uplink-downlink configuration 2 mainly deployed in a current network is used as an example. An uplink subframe 2 on a carrier may support feedback of four ACK/NACK bits. CA of five carriers with a TDD uplink-downlink configuration 2 is corresponding to 20 ACK/NACK bits. In this case, a preconfigured downlink subframe set associated with the uplink subframe 2 includes downlink subframes 4, 5, 6, and 8 on the five carriers configured for the UE. Therefore, an ACK/NACK codebook that needs to be fed back in the uplink subframe 2 is determined based on the preconfigured downlink subframe set associated with the uplink subframe 2. The ACK/NACK codebook is a bit stream in which original ACK/NACK bits that are not coded are sorted in a particular sequence. A size of the ACK/NACK codebook in this example is 20. Specifically, sorting may be performed in a subframe-first and carrier-second order, that is, ACK/NACK bits corresponding to downlink subframes 4, 5, 6, and 8 on a carrier 1 are first sorted, then ACK/NACK bits corresponding to downlink subframes 4, 5, 6, and 8 on a carrier 2 are sorted, and so on. Particularly, in the ACK/NACK codebook, a NACK is filled in an ACK/NACK bit location that is corresponding to a downlink subframe that is not scheduled or a downlink subframe in which the UE does not receive downlink data.

With further evolution of LTE technologies, feedback of an ACK/NACK with a larger quantity of bits needs to be supported in the future, for example, far greater than 22 bits (a maximum of ACK/NACK bits supported by current CA of five carriers). In one scenario, CA of more carriers (hereinafter referred to as super CA) is introduced, for example, CA of 32 carriers. In this case, if CA is to be performed on the 32 carriers with a TDD uplink-downlink configuration 2, an ACK/NACK of 128 bits needs to be fed back. For super CA, even if a relatively large quantity of carriers are configured for the UE, a quantity of carriers and/or downlink subframes actually scheduled for the UE in a subframe may be not large. For example, if the 32 carriers with the TDD uplink-downlink configuration 2 are configured, the preconfigured downlink subframe set associated with the uplink subframe 2 includes 128 downlink subframes. However, a quantity of actually scheduled downlink subframes may be far less than 128. For example, only 10 carriers are scheduled, and not more than 50 ACK/NACK bits are to be fed back. In this case, if the current manner of determining the ACK/NACK codebook based on the preconfigured downlink subframe set is still used, a large quantity of NACKs need to be filled in, and consequently, a new PUCCH format with relatively high overheads is used, or excessive resource overheads are occupied on a PUSCH. In another perspective, even if a particular quantity of resources on a PUCCH or a PUSCH in a specified format are used, demodulation performance of an ACK/NACK codebook filled with a large quantity of NACKs is significantly lower than demodulation performance of an ACK/NACK codebook in which no NACK is filled. Especially, when decoding complexity is considered, the prior filled-in NACK information may not be considered when decoding is implemented. Therefore, how to transmit an ACK/NACK in super CA is an urgent problem to be resolved.

In this example of the present disclosure, the foregoing problems are fully considered, the terminal performs feedback according to a downlink subframe actually scheduled by a network device (for example, the base station), and a downlink subframe that is not scheduled by the network device is not considered, thereby reducing a bit quantity of a codebook fed back by the terminal, and reducing system overheads. In addition, because the downlink subframe that is not scheduled by the network device is not considered, a large quantity of NACKs do not need to be filled in the codebook, thereby enhancing demodulation performance. Further, an ACK/NACK codebook generation manner may be optimized to improve uplink resource utilization.

The following describes the examples of the present disclosure in further detail with reference to the accompanying drawings in this specification.

FIG. 1 is a flowchart of an information sending method according to an example of the present disclosure. As shown in FIG. 1, that a network device is a base station is used as an example in the following description process. Steps of the method are described as follows:

Step 101: A terminal determines to send feedback information for a downlink subframe to a network device in a first feedback manner, where in the first feedback manner, a first codebook of the feedback information is corresponding to a downlink subframe in an instantly scheduled downlink subframe set, the instantly scheduled downlink subframe set includes the downlink subframe of the terminal that is actually scheduled by the network device, and the terminal is a terminal supporting CA.

Step 102: The terminal sends the feedback information to the network device in the first feedback manner.

In this example of the present disclosure, a bit stream in which original ACK/NACK bits fed back in the first feedback manner are sorted in a particular sequence is referred to as the first codebook, and the first codebook is coded to obtain coded feedback information. For example, the original ACK/NACK bits may be sorted in a subframe-first and carrier-second order, to obtain the first codebook.

Based on super CA codebook generation described above, an ACK/NACK codebook may be generated based on the instantly scheduled downlink subframe set, and the instantly scheduled downlink subframe set is a subset of the preconfigured downlink subframe set described above. That is, actually scheduled downlink subframes of the base station may be all downlink subframes included in the preconfigured downlink subframe set, or may be some downlink subframes included in the preconfigured downlink subframe set.

It is assumed that 10 carriers are configured for the terminal, and an uplink-downlink configuration of each carrier is a TDD uplink-downlink configuration 2. An uplink subframe 2 is used as an example. A preconfigured downlink subframe set associated with the uplink subframe 2 includes all downlink subframes 4, 5, 6, and 8 on all the 10 carriers. In a scheduling scenario, it is assumed that the instantly scheduled downlink subframe set actually scheduled by the base station includes downlink subframes 4 on carriers 1 to 7, downlink subframes 5 on a carrier 1, a carrier 3, and a carrier 5, downlink subframes 6 on carriers 1 to 6, and downlink subframes 8 on carriers 1 to 5. An ACK/NACK codebook (the first codebook) that needs to be transmitted in the current uplink subframe 2 is determined according to the instantly scheduled downlink subframe set. In this case, a size of the determined ACK/NACK codebook is 21, and it is assumed that each downlink subframe is corresponding to one ACK/NACK bit.

Optionally, in another example of the present disclosure, the method further includes:

determining, by the terminal according to a detected downlink control channel in the downlink subframe, the downlink subframe scheduled by the network device.

Generally, when detecting the downlink control channel, the terminal may receive a downlink data channel or send an uplink data channel according to scheduling information carried on the downlink control channel. Therefore, when detecting the downlink control channel, the terminal may determine that the downlink subframe corresponding to the downlink control channel is scheduled by the base station. That is, the terminal may determine, according to the detected downlink control channel, the downlink subframe scheduled by the base station.

Optionally, in another example of the present disclosure, the method further includes:

obtaining, by the terminal, an index field carried on the downlink control channel, where a value of the index field is a count value obtained by performing accumulative counting in a carrier-first and subframe-second order in the instantly scheduled downlink subframe set.

If the terminal determines, according to only the detected downlink control channel, the downlink subframe actually scheduled by the base station, when the base station schedules one downlink subframe, but the terminal does not detect a downlink control channel in the downlink subframe, the terminal may determine that the base station does not schedule the downlink subframe. Therefore, the result determined by the terminal is not accurate enough. To resolve this problem, the index field is introduced in this example.

In this example, each downlink control channel carries an index field, and the index field may be, for example, a downlink assignment index (DAI) index field. The DAI index field may be a newly added bit, may be an existing bit on a current downlink control channel, or may be an implicit non-bit indicator, for example, a scrambling code or a combination of some statuses of some bits.

The following uses an example in which each downlink control channel includes a 2-bit DAI index field to describe how the terminal identifies, according to the DAI index field, an ACK/NACK codebook consistent with that understood by an access network device side (for example, the base station).

In this example, values of DAI index fields on respective downlink control channels may be successively accumulated in a carrier-first and subframe-second order. For example, an accumulative value is increased by 1 each time. It should be noted that because there is only the 2-bit DAI index currently, cyclic counting needs to be performed. For example, the following formula is used:

$$Y=(X-1)\bmod 4+1 \qquad (1)$$

In formula (1), mod indicates a modulo operation. It can be learned that when X=1, 5, and 9, values of corresponding DAI index fields (that is, values of Y) are the same, for example, 1. For example, in this case, the value of the DAI index field may be "00". That is, when the DAI index field is "00", the value of Y is 1. X is an accumulated counting value of an actually scheduled downlink subframe, and Y is an actual value of the DAI index field, that is, a value obtained by performing a modulo operation according to the foregoing formula. Certainly, the foregoing formula (1) is merely an example, and another accumulative counting method is not excluded, provided that cyclic value counting is successively performed according to four statuses of the 2-bit DAI index field. For example, cyclic value setting may be performed according to actual values 0, 1, 2, and 3.

In this way, if the terminal misses detecting some downlink control channels, for example, if the terminal continuously receives downlink control channels whose DAI index field values are 1 and 4, the terminal may learn that two downlink control channels that are between the downlink control channels whose index field values are 1 and 4 and whose DAI index field values are 2 and 3 are undetected. In this case, when determining the ACK/NACK codebook (first codebook), the terminal may place two NACKs at ACK/NACK bit locations associated with downlink subframes corresponding to the foregoing two undetected downlink control channels, that is, fill in zeros. This is equivalent to the fact that the downlink subframe actually scheduled by the base station is determined.

Optionally, in another example of the present disclosure, the method further includes:

obtaining, by the terminal, a sum field carried on the downlink control channel, where the sum field is used to indicate a total quantity of scheduled downlink subframes of the terminal in the instantly scheduled downlink subframe set; or the sum field is used to indicate a total quantity of scheduled downlink subframes of the terminal in a downlink subframe set corresponding to a current downlink subframe number in the instantly scheduled downlink subframe set; or the sum field is used to indicate a total quantity of scheduled downlink subframes of the terminal in a downlink subframe set corresponding to a current downlink subframe number in the instantly scheduled downlink subframe set and in a downlink subframe set corresponding to subframe numbers of all downlink subframes before a subframe moment of the current downlink subframe number.

The DAI sum field is used to indicate a bit quantity of an ACK/NACK codebook, and the bit quantity may also be referred to as a codebook size. The codebook size is less than a bit quantity of an ACK/NACK corresponding to the preconfigured downlink subframe set, but is greater than or equal to a quantity of downlink subframes or transport blocks in the instantly scheduled downlink subframe set. When the codebook size is greater than the quantity of downlink subframes or transport blocks in the instantly scheduled downlink subframe set, both the UE and the base station determine that at least one NACK is filled in at the end of the codebook, and a specific quantity of filled-in NACKs is equal to the bit quantity of the codebook minus a quantity of downlink subframes or transport blocks that are in the instantly scheduled downlink subframe set and in which downlink data is actually scheduled.

It can be learned from the foregoing example that the terminal may determine, according to values of DAI index fields on two downlink control channels, whether another downlink control channel between the two downlink control channels is not detected. However, the terminal cannot determine, according to only the DAI index field, whether a downlink control channel at the end is not detected. For example, if the terminal misses detecting the last one or two downlink control channels, for example, if the terminal continuously receives downlink control channels whose DAI index field values are 1 and 2, the terminal cannot determine, according to the DAI index field, whether a downlink control channel whose DAI index field value is greater than 2 is detected. To resolve this problem, a sum field is introduced in this example, and the sum field may be, for example, a DAI sum field, and may be used jointly with the DAI index field.

In this example, each downlink control channel may carry a DAI sum field in addition to a DAI index field. The DAI sum field may be a newly added bit, may be an existing bit on a current downlink control channel, or may be an implicit non-bit indicator, for example, a scrambling code or a combination of some statuses of some bits.

The following uses an example in which each downlink control channel includes a 2-bit DAI sum field to describe how the terminal identifies, according to a DAI index field and the DAI sum field, an ACK/NACK codebook consistent with that understood by an access network device side (for example, the base station).

For the DAI sum field, there may be several different value setting manners, and the manners are separately described below.

Value Setting Manner 1

The DAI sum field may be used to indicate a total quantity of scheduled downlink subframes of the terminal in a downlink subframe set corresponding to a current downlink subframe number.

For example, it is assumed that 10 carriers are configured for the terminal, and an uplink-downlink configuration of each carrier is a TDD uplink-downlink configuration 2. In a scheduling scenario, it is assumed that the instantly scheduled downlink subframe set actually scheduled by the base station includes downlink subframes 4 on carriers 1 to 7, downlink subframes 5 on a carrier 1, a carrier 3, and a carrier 5, downlink subframes 6 on carriers 1 to 6, and downlink subframes 8 on carriers 1 to 5.

For example, for a downlink subframe whose number is 4 (that is, a downlink subframe 4), a downlink subframe set corresponding to the downlink subframe 4 includes seven downlink subframes 4 on carriers 1 to 7, and a DAI sum field corresponding to the downlink subframe 4 may be used to indicate a total quantity of scheduled downlink subframes 4 of the terminal in the downlink subframe set corresponding to the downlink subframe 4. For example, the terminal may schedule only downlink subframes 4 on carriers 1 to 3.

Value Setting Manner 2

The sum field is used to indicate a total quantity of scheduled downlink subframes of the terminal in a downlink subframe set corresponding to a current downlink subframe number in the instantly scheduled downlink subframe set and in a downlink subframe set corresponding to subframe numbers of all downlink subframes before a subframe moment of the current downlink subframe number.

For example, it is assumed that 10 carriers are configured for the terminal, and an uplink-downlink configuration of each carrier is a TDD uplink-downlink configuration 2. In a scheduling scenario, it is assumed that the instantly scheduled downlink subframe set actually scheduled by the base station includes downlink subframes 4 on carriers 1 to 7, downlink subframes 5 on a carrier 1, a carrier 3, and a carrier 5, downlink subframes 6 on carriers 1 to 6, and downlink subframes 8 on carriers 1 to 5.

For example, for a downlink subframe whose number is 4 (that is, a downlink subframe 4), a downlink subframe set corresponding to the downlink subframe 4 includes seven downlink subframes 4 on carriers 1 to 7, and a DAI sum field corresponding to the downlink subframe 4 may be used to indicate a total quantity of scheduled downlink subframes 4 (because the number 4 is a first number) of the terminal in the downlink subframe set corresponding to the downlink subframe 4. For example, the terminal may schedule only downlink subframes 4 on carriers 1 to 3. For a downlink subframe whose number is 5 (that is, a downlink subframe 5), a downlink subframe set corresponding to the downlink subframe 5 includes downlink subframes on a carrier 1, a carrier 3, and a carrier 5. Subframe numbers of all downlink subframes before a subframe moment of the downlink subframe 5 are 4, and a downlink subframe set corresponding to the subframe numbers of all the downlink subframes before the subframe moment of the downlink subframe 5 is a downlink subframe set corresponding to a downlink subframe 4. In this case, a DAI sum field corresponding to the downlink subframe 5 may be used to indicate a total quantity of scheduled downlink subframes of the terminal in the downlink subframe corresponding to the downlink subframe 4 and a total quantity of scheduled downlink subframes 5 of the terminal in a downlink subframe set corresponding to the downlink subframe 5.

Value Setting Manner 3

The sum field is used to indicate a total quantity of scheduled downlink subframes of the terminal in the instantly scheduled downlink subframe set.

For example, it is assumed that 10 carriers are configured for the terminal, and an uplink-downlink configuration of each carrier is a TDD uplink-downlink configuration 2. In a scheduling scenario, it is assumed that the instantly scheduled downlink subframe set actually scheduled by the base station includes downlink subframes 4 on carriers 1 to 7, downlink subframes 5 on a carrier 1, a carrier 3, and a carrier 5, downlink subframes 6 on carriers 1 to 6, and downlink subframes 8 on carriers 1 to 5.

For example, actually scheduled downlink subframes of the terminal are downlink subframes 4 on carriers 1 to 4, a downlink subframe 5 on a carrier 1, a downlink subframe 6 on the carrier 1, and a downlink subframe 8 on the carrier 1. In this case, a DAI sum field corresponding to each downlink subframe is used to indicate the total quantity of actually scheduled downlink subframes of the terminal (in this example, the total quantity of actually scheduled downlink subframes of the terminal is 7). However, in the third value setting manner, predictive scheduling needs to be performed in terms of time in an indication manner of the DAI sum field, that is, a future scheduling status of a downlink subframe n+1 also needs to be considered when a scheduling decision about a downlink subframe n is being made.

Regardless of a value setting manner of the DAI sum field, the quantity of scheduled downlink subframes may be represented as a quantity of downlink data channels in these scheduled downlink subframes, and may further include a quantity of specified downlink control channels. The specified downlink control channel herein is not used for downlink data scheduling, but is used to indicate termination of SPS (Semi-Persistent Scheduling, semi-persistent scheduling). In addition, because the specified downlink control channel may also be provided with corresponding ACK/NACK feedback, the specified downlink control channel also needs to be included in the total quantity of scheduled downlink subframes.

In addition, the downlink data channel herein may include a dynamically scheduled downlink data channel, or may include a downlink control channel obtained by means of SPS. Downlink control channel scheduling is performed on the dynamically scheduled downlink data channel, and no downlink control channel scheduling is performed on the downlink control channel obtained by means of SPS.

Even if missed detection occurs on a downlink control channel, the terminal can accurately restore, by using the DAI index field and the DAI sum field, an ACK/NACK codebook (the first codebook) corresponding to the downlink subframe actually scheduled by the base station, and the ACK/NACK codebook includes a codebook size and a downlink subframe corresponding to each ACK/NACK bit in the codebook. The first codebook is determined by using the instantly scheduled downlink subframe set, so that flexible use of the first codebook and a corresponding PUCCH format and flexible downlink data scheduling can be implemented. In addition, zero filling does not need to be performed on an ACK/NACK of a non-scheduled subframe, thereby improving resource utilization of a PUCCH. In the same format, a performance gain of the PUCCH can be generated by reducing a data volume of the first codebook.

However, there is a risk of determining, by using the DAI index field and the DAI sum field, an ACK/NACK that is based on the instantly scheduled downlink subframe set. For example, some error events may occur at a low probability.

For example, if the terminal misses detecting at least four consecutive downlink control channels that are scheduled by the base station, an ACK/NACK codebook consistent with that understood by the base station may fail to be accurately restored by using the 2-bit DAI index field and the 2-bit DAI sum field. Because values of DAI index fields included in the four continuously undetected downlink control channels are 1, 2, 3, and 4, or 4, 1, 2, and 3, for the terminal, values of DAI index fields in other actually received downlink control channels are still consecutive and are head-to-tail connected, that is, 1, 2, 3, 4, 1, 2, . . . , and so on. In this case, because a value of the DAI sum field also includes two bits, the foregoing error event cannot be found. When the quantity of actually scheduled downlink subframes is 1, 5, or 9, because the value of the DAI sum field each indicates that a value of Y is 1, the terminal cannot find that the at least four downlink control channels are continuously undetected.

Therefore, considering the foregoing error event that may occur at a low probability, in another example of the present disclosure, that the terminal sends the feedback information to the network device in the first feedback manner includes:

adding, by the terminal, a CRC (cyclic redundancy check) code to the obtained first codebook;

performing, by the terminal, channel coding on the feedback codebook to which the CRC is added, to obtain the feedback information; and sending, by the terminal, the feedback information to the network device.

That is, the CRC may be added to the first codebook before channel coding is performed, and then channel coding is performed on a dynamic codebook obtained after the CRC bit is added. Specifically, convolutional coding may be preferentially performed on the dynamic codebook. Currently, other coding methods such as RM (Reed-Muller) coding are not excluded.

In this case, the terminal incorrectly determines the size of the first codebook. When a CRC is being added, for example, a length of the CRC is 8 bits or 16 bits, because sizes of the first codebook that are assumed by the terminal and the access network device are inconsistent, adding of the CRC fails when the access network device (for example, the base station) decodes the feedback information. This avoids a serious error that the access network device may incorrectly determine that a NACK in the feedback information is an ACK. However, when the instantly scheduled downlink subframe set is smaller, the size of the determined first codebook is smaller, for example, less than 20 bits. In this case, if a CRC bit is added, CRC overheads are relatively high.

Optionally, in another example of the present disclosure, before the terminal determines to send the feedback information for the downlink subframe to the network device in the first feedback manner, the method further includes:

receiving, by the terminal, a first indication field delivered by the network device; and that a terminal determines, to send feedback information for a downlink subframe to a network device in a first feedback manner includes:

if the first indication field indicates first status information, determining, by the terminal, to send the feedback information to the network device in the first feedback manner corresponding to the first status information.

For example, the terminal may obtain the first indication field by using an uplink grant delivered by the base station. For example, the first indication field includes two bits. For example, the first indication field may be a newly added bit in the uplink grant; or the first indication field may be an existing bit in the uplink grant, for example, the first indication field is a UL_DAI (UL_DAI, uplink-downlink assignment index) field. For example, for a value of the first indication field, values "10" and "11" are classified into a first status set, and values "01" and "00" are classified into a second status set. For example, if the value of the first indication field is the first status set, it may be determined that feedback is performed in the first feedback manner; or if the value of the first indication field is the second status set, it may be determined that feedback is performed in the second feedback manner.

If the first status set indicates the first codebook, different statuses of the first status set may be further used to indicate another control channel, for example, used to indicate information about a quantity of physical resources occupied for currently transmitting an ACK/NACK on an uplink data channel. A specific quantity of physical resources may be a specific quantity of REs (resource element), or may be different proportion factors. The proportion factor indicates a proportion of uplink data transmitted on an uplink data channel to an ACK/NACK coding rate or a quantity of used physical resources. The terminal may calculate the quantity of physical resources occupied by the ACK/NACK on the uplink data channel by using the proportion factor and a coding rate of uplink data indicated in the uplink grant or a quantity of physical resources.

Certainly, the correspondence between a status set and a feedback manner herein is merely an example, and another method for determining a feedback manner also falls within the protection scope of the examples of the present disclosure. A second feedback manner is described below.

As described above, the DAI index field and the DAI sum field may be used to perform feedback in the first feedback manner. In addition, the CRC may be further added to the first codebook for a better implementation effect. In these examples, the first indication field may be used to indicate a specific feedback manner.

However, because extra bits need to be added for adding the CRC, overheads are increased to some extent. Therefore, the following describes three manners of determining the first codebook in the first feedback manner. In the three manners, no CRC needs to be added to the first codebook.

Manner 1

Optionally, in another example of the present disclosure, the method further includes:

receiving, by the terminal, a first indication field delivered by the network device, where the first indication field carries a round quantity of cyclic value setting indicated by the index field.

That is, in this example, in addition to detecting the downlink control channel to obtain the DAI index field and the DAI sum field carried on the downlink control channel, the terminal may receive the first indication field. In this example, a value of the DAI index field is consistent with that in the foregoing example, and a value of the DAI sum field is also consistent with that in the foregoing example. However, in this case, the first indication field is not used to indicate a feedback manner. That is, when the solution described in this example is used, the first feedback manner is used according to a default system setting.

As described above, if the terminal determines the first codebook according to indications of the DAI index field and the DAI sum field, an error event that the terminal misses detecting at least four consecutive downlink control channels may occur at a low probability. A 2-bit DAI index field and a 2-bit DAI sum field are separately used as examples. If detection of four consecutive downlink control channels is missed, the foregoing error event may occur.

It is assumed that values of DAI index fields are accumulatively counted in the carrier-first and subframe-second order described above, and the DAI sum field is used to indicate the total quantity of actually scheduled downlink subframes in the instantly scheduled downlink subframe set; that is, in the instantly scheduled downlink subframe set, values of DAI sum fields carried on all downlink control channels are the same.

It is assumed that the instantly scheduled downlink subframe set includes 19 downlink subframes, values of 19 DAI index fields corresponding to the 19 downlink subframes are {1, 2, 3, 4, 1, 2, 3, 4, 1, 2, 3, 4, 1, 2, 3, 4, 1, 2, 3}, and values of 19 DAI sum fields corresponding to the 19 downlink subframes are all (19−1) mod 4+1=3.

For example, values of DAI index fields received by the terminal are {1, 2, X, 4, 1, X, X, X, X, 2, 3, 4, 1, 2, 3, X, X, X, X}, and values of corresponding DAI sum fields are {3, 3, X, 3, 3, X, X, X, X, 3, 3, 3, 3, 3, 3, X, X, X, X}. X represents a downlink control channel undetected by the terminal.

It can be learned that the terminal misses detecting four consecutive downlink control channels, and in this case, it is most likely that the terminal determines that the codebook size of the first codebook is 11, but not 19 downlink subframes that are actually scheduled by an access network device (for example, the base station).

In this example, to find the foregoing error event, the first indication field in the uplink grant may be used to facilitate indication. Details are as follows:

For example, the terminal receives a 2-bit UL_DAI field (the first indication field), and the UL_DAI field may be used to indicate a round quantity of cyclic value setting of each DAI index field in the instantly scheduled downlink subframe set. For example, the round quantity is 5, and a status of the 2-bit UL_DAI field may be "00". In this case, after the terminal receives the UL_DAI field, there is a high probability that the terminal can identify the error event of continuous missed detection based on the DAI index field and the DAI sum field, and can further determine that the total quantity of actually scheduled downlink subframes is 19.

Certainly, the first indication field may be further used to indicate the total quantity of the scheduled downlink subframes of the terminal in the instantly scheduled downlink subframe set. In this case, even if the terminal misses detecting four consecutive downlink control channels, the terminal may determine, by using the received first indication field, that the total quantity of actually scheduled downlink subframes is 19.

Manner 2

Optionally, in another example of the present disclosure, the method further includes:

obtaining, by the terminal, a sum field carried on the downlink control channel, and receiving a first indication field delivered by the network device, where the sum field and the first indication field are used to jointly indicate a total quantity of scheduled downlink subframes of the terminal in the instantly scheduled downlink subframe set, and a bit carried in the first indication field is a high-order bit.

In this example, the terminal may detect the downlink control channel in the foregoing manner to obtain the DAI index field and the DAI sum field carried on the downlink control channel, and may further obtain the first indication field. For example, the first indication field may be a UL_DAI field. In this example, a value of the DAI index field is consistent with that in the foregoing example, but a value of the DAI sum field and a value of the first indication field are inconsistent with those in the foregoing example. In this example, the sum field and the first indication field are used to jointly indicate the total quantity of the scheduled downlink subframes of the terminal in the instantly scheduled downlink subframe set.

A 2-bit UL_DAI field and a 2-bit DAI sum field are used as an example. The UL_DAI field and the DAI sum field are used to jointly indicate the quantity of actually scheduled downlink subframes in the instantly scheduled downlink subframe set. Further, joint coding may be performed on the UL_DAI field and the DAI sum field. In addition, considering that the terminal may fail to receive the first indication field, it may be implemented that the first indication field is located at a high-order bit and the DAI sum field is located at a low-order bit during joint coding. In this case, even if the terminal fails to receive the first indication field, the terminal can determine, to some extent, the quantity of actually scheduled downlink subframes in the instantly scheduled downlink subframe set according to an indication of the DAI sum field.

For example, the quantity of actually scheduled downlink subframes of the terminal is 19. Considering that the DAI sum field is actually used to indicate 19, and values of the 2-bit UL_DAI field and the 2-bit DAI sum field obtained after joint coding may be cyclically obtained based on a round of 16, a value of the high-order 2-bit UL_DAI field is "00", a value of the low-order 2-bit DAI sum field is "01", and a specific value may be actually 3, 19, 35, or the like. The terminal may determine, according to a quantity of received downlink control channels, that the size of the first codebook is actually 19.

Optionally, in another example of the present disclosure, the solution of performing joint coding on the first indication field and the DAI sum field may also be used to indicate another DAI sum field. For example, the first indication field and the DAI sum field are used to jointly indicate a total quantity of scheduled downlink subframes of the terminal in a downlink subframe set corresponding to a current downlink subframe number in the instantly scheduled downlink subframe set and in a downlink subframe set corresponding to subframe numbers of all downlink subframes before a subframe moment of the current downlink subframe number. In this case, joint coding may be performed on the first indication field and a DAI sum field that is in the last subframe in the instantly scheduled downlink subframe set and that is received by the terminal, where the first indication field is located at a high-order bit and the DAI sum field is located at a low-order bit.

Manner 3

Optionally, in another example of the present disclosure, the method further includes:

receiving, by the terminal, a first indication field delivered by the network device, where the first indication field is used to indicate the total quantity of the scheduled downlink subframes of the terminal in the instantly scheduled downlink subframe set.

In this example, the terminal needs to determine, according to the DAI index field, the DAI sum field, and the first indication field, the first codebook corresponding to the instantly scheduled downlink subframe set. For specific indication manners of the DAI index field and the DAI sum field, refer to the descriptions of the foregoing example.

Figure 3:
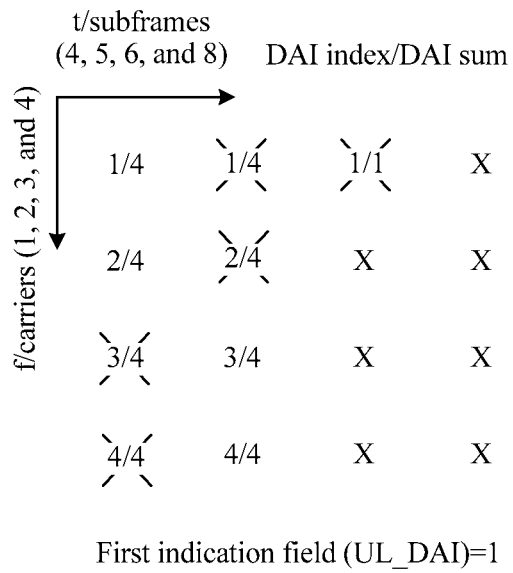
FIG. 3 is a schematic diagram of a first indication field according to an example of the present disclosure.

FIG. 3 is used as an example for description. It is assumed that the preconfigured downlink subframe set includes downlink subframes 4, 5, 6, and 8 on carriers 1 to 4, and each carrier is corresponding to a TDD uplink-downlink configuration 2. It is assumed that the instantly scheduled downlink subframe set actually scheduled by the base station includes subframes 4, 5, and 6 on a carrier 1 and subframes 4 and 5 on carriers 2 to 4. X indicates that the base station does not schedule the terminal. X in a scheduled downlink subframe indicates that the UE misses detecting scheduling information of the subframe, that is, a PDCCH. Accumulative counting is performed on the DAI index field in a carrier-first and subframe-second order, and the DAI sum field indicates a quantity of scheduled downlink subframes corresponding to a current subframe number. For example, if a subframe number is 4, a total of four downlink subframes are scheduled, that is, subframes 4 on the carriers 1 to 4. The first indication field, for example, a UL_DAI field in a UL_grant, is used to indicate the total quantity of scheduled downlink subframes in the instantly scheduled downlink subframe set. The total quantity is specifically 9, and is 1 after a modulo operation is performed.

Based on the foregoing assumption, the terminal can accurately restore, based on the foregoing three DAI fields, the first codebook consistent with that understood by the base station, and the first codebook includes nine bits. On the contrary, if the DAI sum field is not used, the terminal cannot restore the first codebook according to only the DAI index field and the UL_DAI field, and in this case, a bit quantity of the first codebook may be understood as 5 by the terminal. Because the terminal misses detecting four consecutive PDCCHs, obtained values of DAI index fields are consecutive. Missed detection of the four consecutive PDCCHs may be found based on the foregoing three DAI fields. Specifically, the terminal may determine, according to a DAI sum field corresponding to a subframe number 4 and a DAI index field, that two PDCCHs are not detected in a subframe corresponding to the subframe number 4. Likewise, the terminal finds that two PDCCHs are not detected in a subframe 5. Finally, the terminal determines, based on a value of the UL_DAI field, that one PDCCH is not detected at the end. In this way, the first codebook that is consistent with that understood by the base station and whose bit quantity is 9 is restored.

It should be further noted that because the UL_grant in which the UL_DAI field is located is usually sent earlier than the latest downlink subframe in the preconfigured downlink subframe set, predictive scheduling is not required when the base station sets the value of the UL_DAI field.

Optionally, the first indication field is used to indicate a bit quantity of an ACK/NACK codebook, and the bit quantity may also be referred to as a codebook size. The codebook size is less than a bit quantity of an ACK/NACK corresponding to the preconfigured downlink subframe set, but is greater than or equal to a quantity of downlink subframes or transport blocks in the instantly scheduled downlink subframe set. When the codebook size is greater than the quantity of downlink subframes or transport blocks in the instantly scheduled downlink subframe set, both the UE and the base station determine that at least one NACK is filled in at the end of the codebook, and a specific quantity of filled-in NACKs is equal to the bit quantity of the codebook minus a quantity of downlink subframes or transport blocks that are in the instantly scheduled downlink subframe set and in which downlink data is actually scheduled.

Optionally, in another example of the present disclosure, the first indication field may be a field in a UL_grant (uplink scheduling grant).

The foregoing examples have described sending of the feedback information to the base station in the first feedback manner. The following describes sending of the feedback information to the base station in the second feedback manner.

Optionally, in another example of the present disclosure, if the first indication field is used to indicate the first feedback manner or the second feedback manner, in this case, after the terminal receives the first indication field delivered by the network device, the method further includes:

if the first indication field indicates second status information, determining, by the terminal, to send the feedback information for the downlink subframe to the network device in the second feedback manner corresponding to the second status information, where in the second feedback manner, a second codebook of the feedback information is corresponding to a downlink subframe in a preconfigured downlink subframe subset, the preconfigured downlink subframe subset is a subset of a preconfigured downlink subframe set, and the preconfigured downlink subframe set is configured for the terminal and includes all downlink subframes on all carriers corresponding to an uplink subframe carrying the feedback information; and sending, by the terminal, the feedback information to the network device in the second feedback manner.

In this example of the present disclosure, a bit stream in which original ACK/NACK bits fed back in the second feedback manner are sorted in a particular sequence is referred to as the second codebook, and the second codebook is coded to obtain the feedback information. For example, the original ACK/NACK bits may be sorted in a subframe-first and carrier-second order, to obtain the second codebook.

In the foregoing example, to avoid an error that the terminal misses detecting at least four consecutive downlink control channels, a CRC may be added to the first codebook, and then channel coding is performed on the first codebook to which the CRC is added, to obtain the feedback information. However, adding of the CRC results in some overheads. When the size of the first codebook is relatively large, the overheads of the CRC bit may be ignored. However, if the size of the first codebook is relatively small, for example, about 20 bits, adding of the CRC with a length of 8 bits or even 16 bits may result in relatively high overheads. In view of this, the CRC may not be added. However, if the CRC is not added, the access network device (such as the base station) may fail to discover the foregoing error event of the first codebook during ACK/NACK decoding, resulting in a decoding error. Therefore, feedback may be performed in the second feedback manner. In the second feedback manner, the preconfigured downlink subframe subset may be introduced. The preconfigured downlink subframe subset may be a subset of the preconfigured downlink subframe set described above. For example, the second feedback manner may be used in a scenario in which a size of a codebook to be fed back is relatively small. In this case, when channel coding is performed on the second codebook, for example, RM coding may be used, because a decoding algorithm of the RM coding may not depend on the CRC, CRC overheads can be reduced. Certainly, alternatively, another coding manner may be used. This is not limited in this example of the present disclosure.

Optionally, the second codebook may be determined by using the preconfigured downlink subframe subset. For example, one or more preconfigured downlink subframe subsets may be preconfigured for the terminal by using higher layer signaling (for example, RRC (Radio Resource Control) signaling). These preconfigured downlink subframe subsets are subsets of the preconfigured downlink subframe set.

For example, for an uplink subframe 2, a preconfigured downlink subframe set includes downlink subframes 4, 5, 6, and 8 on carriers 1 to 10. In this case, for example, a possible preconfigured downlink subframe subset that may be configured for the terminal may include downlink subframes 4, 5, 6, and 8 on carriers 1 to 5. For example, another possible preconfigured downlink subframe subset that may be configured for the terminal may include downlink subframes 4, 5, 6, and 8 on carriers 6 to 10; or for example, another possible preconfigured downlink subframe subset that may be configured for the terminal may include downlink subframes 4, 5, 6, and 8 on carriers 2 to 6. This is merely an example. A specific manner of configuring a preconfigured downlink subframe subset is not limited in this example of the present disclosure, provided that the preconfigured downlink subframe subset is a subset of the preconfigured downlink subframe set.

For example, for the uplink subframe 2, if the base station configures a preconfigured downlink subframe subset for the terminal, for example, downlink subframes 4, 5, and 6 on carriers 1 to 5, the second codebook may include ACKs/NACKs corresponding to the downlink subframes 4, 5, and 6 on the carriers 1 to 5. In the second feedback manner, the terminal may fill a NACK in a downlink subframe that is not scheduled by the base station in the preconfigured downlink subframe subset.

The terminal performs feedback according to the preconfigured downlink subframe subset, a data volume of a codebook corresponding to the preconfigured downlink subframe subset is usually less than a data volume of a codebook corresponding to the preconfigured downlink subframe set, and the CRC does not need to be added to the second codebook. Therefore, feedback is performed in the second feedback manner, thereby reducing system overheads. In addition, feedback is performed according to a preconfigured downlink subframe, so as to avoid a case in which the terminal provides incorrect feedback because of missed detection, thereby improving system reliability.

Figure 2:
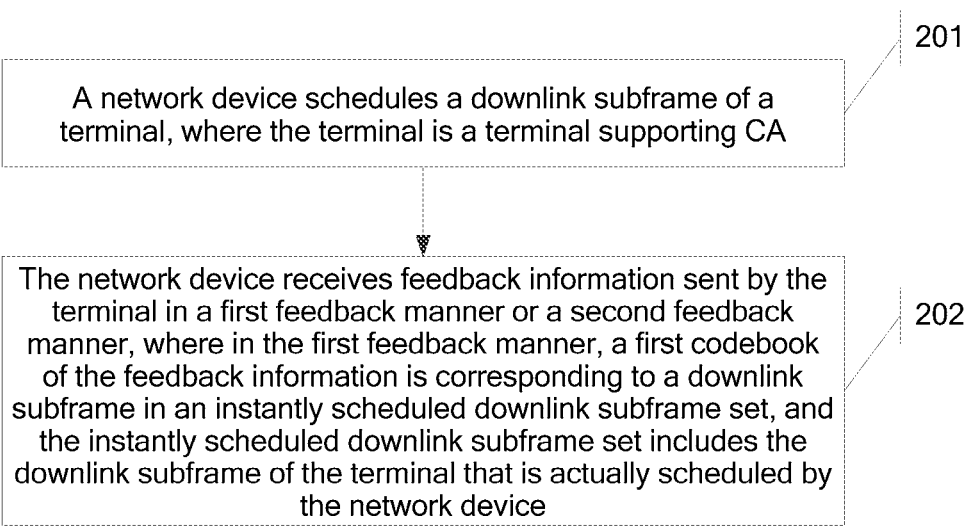
FIG. 2 is a flowchart of an information receiving method according to an example of the present disclosure.

Based on a same disclosure concept and the foregoing examples, FIG. 2 is a flowchart of an information receiving method according to an example of the present disclosure. The method is a method implemented by a network device corresponding to the information sending method shown in FIG. 1. Steps of the method are described as follows:

Step 201: A network device schedules a downlink subframe of a terminal, where the terminal is a terminal supporting CA.

Step 202: The network device receives feedback information sent by the terminal in a first feedback manner, where in the first feedback manner, a first codebook of the feedback information is corresponding to a downlink subframe in an instantly scheduled downlink subframe set, and the instantly scheduled downlink subframe set includes the downlink subframe of the terminal that is actually scheduled by the network device.

Optionally, in another example of the present disclosure, that a network device schedules a downlink subframe of a terminal includes:

adding, by the network device, an index field to a downlink control channel in the downlink subframe, where a value of the index field is a count value obtained by performing accumulative counting in a carrier-first and subframe-second order in the instantly scheduled downlink subframe set.

In this example, the network device may add an index field to a downlink control channel in each scheduled downlink subframe, and the index field may be, for example, the DAI index field described above. When the network device adds the DAI index field to the downlink control channel, the DAI index field may be a newly added bit, may be an existing bit on a current downlink control channel, or may be an implicit non-bit indicator, for example, a scrambling code or a combination of some statuses of some bits.

After obtaining the index field carried on the downlink control channel, the terminal may identify, according to the index field, an ACK/NACK codebook consistent with that understood by the network device. For content such as a possible format of the DAI index field and an identification manner of the terminal, refer to the descriptions in the procedure in FIG. 1.

Optionally, in another example of the present disclosure, that a network device schedules a downlink subframe of a terminal further includes:

adding, by the network device, a sum field to the downlink control channel in the downlink subframe, where the sum field is used to indicate a total quantity of scheduled downlink subframes of the terminal in the instantly scheduled downlink subframe set; or the sum field is used to indicate a total quantity of scheduled downlink subframes of the terminal in a downlink subframe set corresponding to a current downlink subframe number in the instantly scheduled downlink subframe set; or the sum field is used to indicate a total quantity of scheduled downlink subframes of the terminal in a downlink subframe set corresponding to a current downlink subframe number in the instantly scheduled downlink subframe set and in a downlink subframe set corresponding to subframe numbers of all downlink subframes before a subframe moment of the current downlink subframe number.

That is, in addition to the index field, the network device may add the sum field to the downlink control channel. The sum field may be, for example, a DAI sum field. When the network device adds the DAI sum field to the downlink control channel, the DAI sum field may be an existing bit on a current downlink control channel, or may be an implicit non-bit indicator, for example, a scrambling code or a combination of some statuses of some bits.

The terminal may identify, according to the index field or according to both the index field and the sum field, the ACK/NACK codebook consistent with that understood by the network device.

For content such as a possible format of the DAI sum field and a manner of performing identification by the terminal according to the index field and the sum field, refer to the descriptions in the procedure in FIG. 1.

In addition, the sum field is corresponding to several possible value setting manners. For the several value setting manners, refer to the descriptions in the procedure in FIG. 1.

Optionally, in another example of the present disclosure, the method further includes:

delivering, by the network device, a first indication field to the terminal; and that the network device receives feedback information sent by the terminal in a first feedback manner includes:

if the first indication field indicates first status information, receiving, by the network device, the feedback information sent by the terminal in the first feedback manner.

For example, the network device may deliver the first indication field to the terminal by delivering an uplink grant. For example, the first indication field may be a newly added bit in the uplink grant; or the first indication field may be an existing bit in the uplink grant, for example, the first indication field is a UL_DAI field. For example, the network device may preset a correspondence between a status set indicated by the first indication field and a feedback manner, and the network device may deliver the correspondence to the terminal after setting the correspondence. Therefore, after obtaining the first indication field, the terminal can determine the corresponding feedback manner according to the status set corresponding to a value of the first indication field. For example, if the value of the first indication field is a first status set, the terminal performs feedback in the first feedback manner; or if the value of the first indication field is a second status set, the terminal performs feedback in a second feedback manner. Certainly, the correspondence between a status set and a feedback manner is not limited thereto, and may be set according to an actual situation.

In this example, the terminal may obtain the first codebook in the first feedback manner. After obtaining the first codebook, the terminal may add a CRC to the first codebook, and then perform channel coding on the first codebook to which the CRC is added, to obtain the feedback information.

Optionally, in another example of the present disclosure, if the first indication field is used to indicate the first feedback manner or the second feedback manner, after the network device delivers the first indication field to the terminal, the method further includes:

if the first indication field indicates second status information, receiving, by the network device, the feedback information sent by the terminal in the second feedback manner, where in the second feedback manner, a second codebook of the feedback information is corresponding to a downlink subframe in a preconfigured downlink subframe subset, the preconfigured downlink subframe subset is a subset of a preconfigured downlink subframe set, and the preconfigured downlink subframe set is configured for the terminal and includes all downlink subframes on all carriers corresponding to an uplink subframe carrying the feedback information.

That is, in this example, the first indication field is mainly used to indicate a feedback manner of the terminal, and the terminal may determine, according to the received first indication field, a specific feedback manner to be used.

Optionally, in another example of the present disclosure, that a network device schedules a downlink subframe of a terminal further includes:

delivering, by the network device, a first indication field to the terminal, where the first indication field carries a round quantity of cyclic value setting indicated by the index field, or the first indication field is used to indicate the total quantity of the scheduled downlink subframes of the terminal in the instantly scheduled downlink subframe set.

That is, in this example, in addition to detecting the downlink control channel and obtaining the DAI index field and the DAI sum field added by the network device to the downlink control channel, the terminal may receive the first indication field delivered by the network device. In this example, a value of the DAI index field is consistent with that in the foregoing example, and a value of the DAI sum field is also consistent with that in the foregoing example. However, in this case, the first indication field is not used to indicate a feedback manner. That is, when the solution described in this example is used, the first feedback manner may be used according to a default system setting.

Optionally, in another example of the present disclosure, that a network device schedules a downlink subframe of a terminal further includes:

adding, by the network device, a sum field to the downlink control channel in the downlink subframe, and delivers a first indication field to the terminal, where the sum field and the first indication field are used to jointly indicate a total quantity of scheduled downlink subframes of the terminal in the instantly scheduled downlink subframe set, and a bit carried in the first indication field is a high-order bit.

In this example, according to the foregoing manner, the terminal may detect the downlink control channel to obtain the DAI index field and the DAI sum field carried on the downlink control channel, and may further obtain the first indication field. In this example, a value of the DAI index field is consistent with that in the foregoing example, but a value of the DAI sum field and a value of the first indication field are inconsistent with those in the foregoing example. In this example, the sum field and the first indication field are used to jointly indicate the total quantity of the scheduled downlink subframes of the terminal in the instantly scheduled downlink subframe set.

Optionally, in another example of the present disclosure, the first indication field is a field in a UL_grant.

The method described in the procedure in FIG. 2 is corresponding to the method described in the procedure in FIG. 1. For related content, cross reference may be made. Therefore, same or corresponding content is not repeatedly described.

The following describes devices provided in the examples of the present disclosure with reference to the accompanying drawings.

Figure 4:
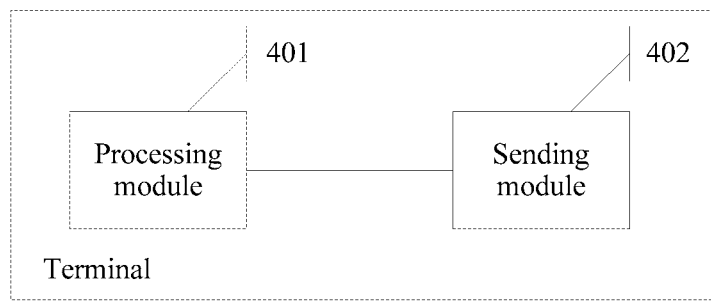
FIG. 4 is a structural block diagram of a terminal according to an example of the present disclosure.

Referring to FIG. 4, based on a same disclosure concept and the foregoing examples, an example of the present disclosure provides a terminal. The terminal may include a processing module 401 and a sending module 402.

The processing module 401 is configured to determine to send feedback information for a downlink subframe to a network device in a first feedback manner, where in the first feedback manner, a first codebook of the feedback information is corresponding to a downlink subframe in an instantly scheduled downlink subframe set, the instantly scheduled downlink subframe set includes the downlink subframe of the terminal that is actually scheduled by the network device, and the terminal is a terminal supporting CA.

The sending module 402 is configured to send the feedback information to the network device in the first feedback manner.

Optionally, in another example of the present disclosure, the processing module 401 is further configured to:

determine, according to a detected downlink control channel in the downlink subframe, the downlink subframe scheduled by the network device.

Optionally, in another example of the present disclosure, the processing module 401 is further configured to:

obtain an index field carried on the downlink control channel, where a value of the index field is a count value obtained by performing accumulative counting in a carrier-first and subframe-second order in the instantly scheduled downlink subframe set.

Optionally, in another example of the present disclosure, the processing module 401 is further configured to:

obtain a sum field carried on the downlink control channel, where the sum field is used to indicate a total quantity of scheduled downlink subframes of the terminal in the instantly scheduled downlink subframe set; or the sum field is used to indicate a total quantity of scheduled downlink subframes of the terminal in a downlink subframe set corresponding to a current downlink subframe number in the instantly scheduled downlink subframe set; or the sum field is used to indicate a total quantity of scheduled downlink subframes of the terminal in a downlink subframe set corresponding to a current downlink subframe number in the instantly scheduled downlink subframe set and in a downlink subframe set corresponding to subframe numbers of all downlink subframes before a subframe moment of the current downlink subframe number.

Optionally, in another example of the present disclosure, the terminal further includes a receiving module, configured to:

receive a first indication field delivered by the network device, where the first indication field carries a round quantity of cyclic value setting indicated by the index field, or the first indication field is used to indicate the total quantity of the scheduled downlink subframes of the terminal in the instantly scheduled downlink subframe set.

Optionally, in another example of the present disclosure, the terminal further includes a receiving module; and the processing module 401 is further configured to obtain a sum field carried on the downlink control channel, and the receiving module is configured to receive a first indication field delivered by the network device, where the sum field and the first indication field are used to jointly indicate a total quantity of scheduled downlink subframes of the terminal in the instantly scheduled downlink subframe set, and a bit carried in the first indication field is a high-order bit.

Optionally, in another example of the present disclosure, the terminal further includes a receiving module;

the receiving module is configured to: before the processing module 401 determines to send the feedback information for the downlink subframe to the network device in the first feedback manner, receive a first indication field delivered by the network device; and the processing module 401 is configured to: if the first indication field indicates first status information, determine to send the feedback information to the network device in the first feedback manner corresponding to the first status information.

Optionally, in another example of the present disclosure, the sending module is configured to:

add a CRC to the obtained first codebook;

perform channel coding on the feedback codebook to which the CRC is added, to obtain the feedback information; and send the feedback information to the network device.

Optionally, in another example of the present disclosure, the first indication field is a field in a UL_grant.

Optionally, in another example of the present disclosure, the processing module 401 is further configured to: after the receiving module receives the first indication field delivered by the network device, if the first indication field indicates second status information, determine to send the feedback information for the downlink subframe to the network device in a second feedback manner corresponding to the second status information, where in the second feedback manner, a second codebook of the feedback information is corresponding to a downlink subframe in a preconfigured downlink subframe subset, the preconfigured downlink subframe subset is a subset of a preconfigured downlink subframe set, and the preconfigured downlink subframe set is configured for the terminal and includes all downlink subframes on all carriers corresponding to an uplink subframe carrying the feedback information; and the sending module 402 is further configured to send the feedback information to the network device in the second feedback manner.

Figure 5:
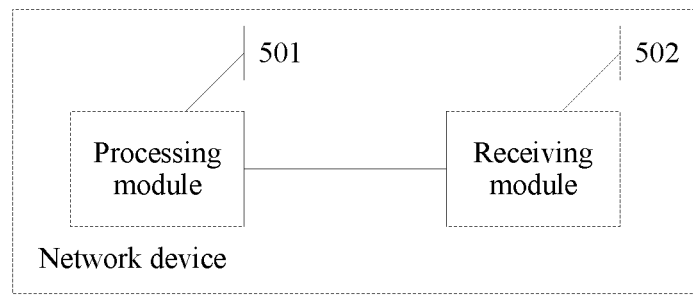
FIG. 5 is a structural block diagram of a network device according to an example of the present disclosure.

Referring to FIG. 5, based on a same disclosure concept and the foregoing examples, an example of the present disclosure provides a network device. The network device may include a processing module 501 and a receiving module 502.

The processing module 501 is configured to schedule a downlink subframe of a terminal, where the terminal is a terminal supporting CA.

The receiving module 502 is configured to receive feedback information sent by the terminal in a first feedback manner, where in the first feedback manner, a first codebook of the feedback information is corresponding to a downlink subframe in an instantly scheduled downlink subframe set, and the instantly scheduled downlink subframe set includes the downlink subframe of the terminal that is actually scheduled by the network device.

Optionally, in another example of the present disclosure, the processing module 501 is configured to:

add an index field to a downlink control channel in the downlink subframe, where a value of the index field is a count value obtained by performing accumulative counting in a carrier-first and subframe-second order in the instantly scheduled downlink subframe set.

Optionally, in another example of the present disclosure, the processing module 501 is configured to:

add a sum field to the downlink control channel in the downlink subframe, where the sum field is used to indicate a total quantity of scheduled downlink subframes of the terminal in the instantly scheduled downlink subframe set; or the sum field is used to indicate a total quantity of scheduled downlink subframes of the terminal in a downlink subframe set corresponding to a current downlink subframe number in the instantly scheduled downlink subframe set; or the sum field is used to indicate a total quantity of scheduled downlink subframes of the terminal in a downlink subframe set corresponding to a current downlink subframe number in the instantly scheduled downlink subframe set and in a downlink subframe set corresponding to subframe numbers of all downlink subframes before a subframe moment of the current downlink subframe number.

Optionally, in another example of the present disclosure, the processing module 501 is configured to:

deliver a first indication field to the terminal, where the first indication field carries a round quantity of cyclic value setting indicated by the index field, or the first indication field is used to indicate the total quantity of the scheduled downlink subframes of the terminal in the instantly scheduled downlink subframe set.

Optionally, in another example of the present disclosure, the processing module 501 is configured to:

add a sum field to the downlink control channel in the downlink subframe, and deliver a first indication field to the terminal, where the sum field and the first indication field are used to jointly indicate a total quantity of scheduled downlink subframes of the terminal in the instantly scheduled downlink subframe set, and a bit carried in the first indication field is a high-order bit.

Optionally, in another example of the present disclosure, the network device further includes a sending module;

the sending module is configured to deliver a first indication field to the terminal; and the receiving module 502 is configured to: if the first indication field indicates first status information, receive the feedback information sent by the terminal in the first feedback manner.

Optionally, in another example of the present disclosure, the receiving module 502 is further configured to:

after the sending module delivers the first indication field to the terminal, if the first indication field indicates second status information, receive the feedback information sent by the terminal in a second feedback manner, where in the second feedback manner, a second codebook of the feedback information is corresponding to a downlink subframe in a preconfigured downlink subframe subset, the preconfigured downlink subframe subset is a subset of a preconfigured downlink subframe set, and the preconfigured downlink subframe set is configured for the terminal and includes all downlink subframes on all carriers corresponding to an uplink subframe carrying the feedback information.

Optionally, in another example of the present disclosure, the first indication field is a field in a UL_grant.

Figure 6:
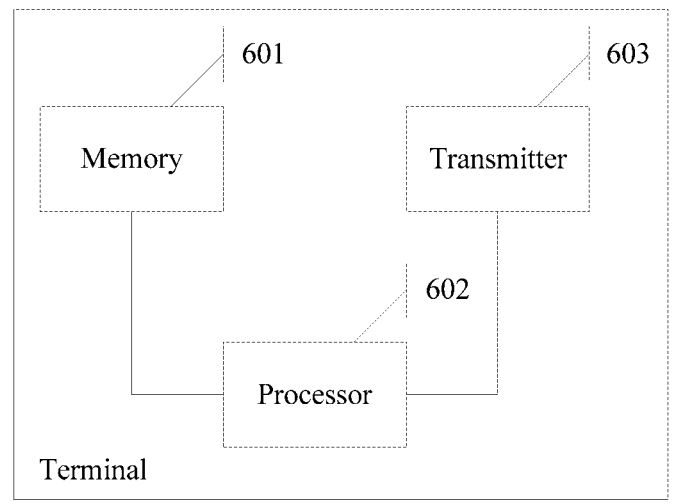
FIG. 6 is a schematic structural diagram of a terminal according to an example of the present disclosure.

Referring to FIG. 6, based on a same disclosure concept and the foregoing examples, an example of the present disclosure provides a terminal. The terminal may include a memory 601, a processor 602, and a transmitter 603.

The processor 602 may be a central processing unit, an ASIC (Application Specific Integrated Circuit), one or more integrated circuits configured to control program execution, a hardware circuit developed by using an FPGA (Field Programmable Gate Array, field programmable gate array), or a baseband chip. There may be one or more memories 601. The memory 601 may include a ROM (ReadOnly Memory), a RAM (Random Access Memory), and a magnetic disk storage. The transmitter 603 may belong to a radio frequency system, and is configured to perform network communication with an external device. Specifically, the transmitter 603 may communicate with the external device by using a network such as an Ethernet, a radio access network, or a wireless local area network.

These memories 601 and the transmitter 603 may be connected to the processor 602 by using a bus, or may be separately connected to the processor 602 by using a dedicated connection cable.

Code corresponding to the methods described above is written permanently into a chip by designing programming for the processor 602, so that when the chip can perform the methods in the foregoing examples during operation. How to design and program the processor 602 is a technology that is well known to a person skilled in the art, and details are not described herein.

The terminal in this example and the terminal in the foregoing examples may be a same terminal. For example, the processor 602 in this example may be used to implement the processing module 401 in FIG. 4, and the transmitter 603 in this example may be used to implement the sending module 402 in FIG. 4.

Optionally, in another example of the present disclosure, the terminal in FIG. 6 may further include a receiver, and the receiver and the transmitter 603 may belong to a radio frequency system. The receiver and the transmitter 603 are configured to perform network communication with an external device. Specifically, the receiver and the transmitter 603 may communicate with the external device by using a network such as an Ethernet, a radio access network, or a wireless local area network. The receiver and the transmitter 603 may be two physical components independent of each other, or may be a same physical component. The receiver may be used to implement the receiving module in the example in FIG. 4.

Figure 7:
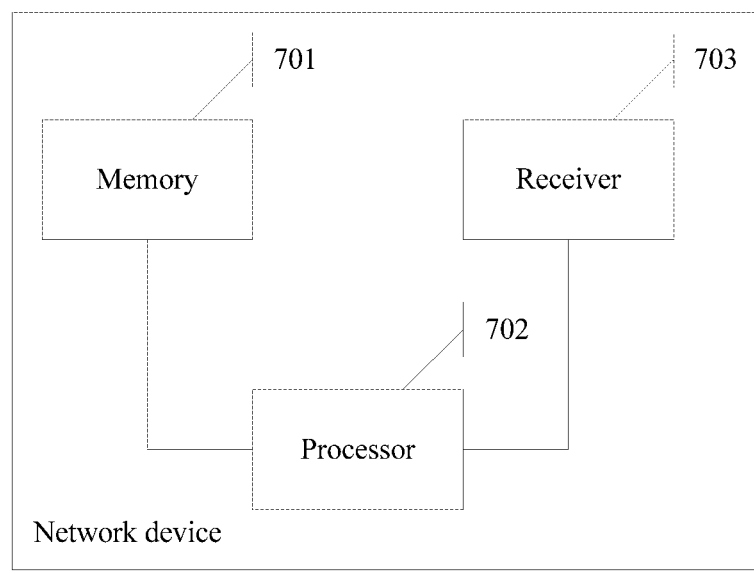
FIG. 7 is a schematic structural diagram of a network device according to an example of the present disclosure.

Referring to FIG. 7, based on a same disclosure concept and the foregoing examples, an example of the present disclosure provides a network device. The network device may include a memory 701, a processor 702, and a receiver 703.

The processor 702 may be specifically a central processing unit, an ASIC, one or more integrated circuits configured to control program execution, a hardware circuit developed by using an FPGA, or a baseband chip. There may be one or more memories 701. The memory 701 may include a ROM, a RAM, and a magnetic disk memory. The receiver 703 may belong to a radio frequency system, and is configured to perform network communication with an external device.

Specifically, the receiver 703 may communicate with the external device by using a network such as an Ethernet, a radio access network, or a wireless local area network.

These memories 701 and the receiver 703 may be connected to the processor 702 by using a bus, or may be separately connected to the processor 702 by using a dedicated connection cable.

Code corresponding to the methods described above is written permanently into a chip by designing programming for the processor 702, so that the chip can perform the methods in the foregoing examples during operation. How to design and program the processor 702 is a technology that is well known to a person skilled in the art, and details are not described herein.

The network device in this example and the network device in the foregoing examples may be a same network device. For example, the processor 702 in this example may be used to implement the processing module 501 in FIG. 5, and the receiver 703 in this example may be used to implement the receiving module 502 in FIG. 5.

Optionally, in another example of the present disclosure, the terminal in FIG. 7 may further include a transmitter, and the receiver 703 and the transmitter may belong to a radio frequency system. The receiver 703 and the transmitter are configured to perform network communication with an external device. Specifically, the receiver 703 and the transmitter may communicate with the external device by using a network such as an Ethernet, a radio access network, or a wireless local area network. The receiver 703 and the transmitter may be two physical components independent of each other, or may be a same physical component. The transmitter may be used to implement the sending module of the terminal in the example in FIG. 5. It should be noted that all the devices in the examples of the present disclosure are devices corresponding to the methods. For descriptions of functions and implementation details of each module in the device, refer to the related part of the corresponding method.

In the examples of the present disclosure, the terminal may send the feedback information for the downlink subframe to the network device in the first feedback manner, that is, the first codebook of the feedback information is determined according to the instantly scheduled downlink subframe set. This is equivalent to the fact that the terminal performs feedback for the downlink subframe actually scheduled by the network device. In this way, information about a downlink subframe that is not actually scheduled by the network device does not need to be fed back, and a quantity of bits included in the first codebook is less than a quantity of bits that need to be fed back by the terminal, thereby greatly reducing system overheads. Alternatively, the terminal may send the feedback information for the downlink subframe to the network device in the second feedback manner, that is, the terminal performs feedback according to the preconfigured downlink subframe subset, where a data volume of a codebook corresponding to the preconfigured downlink subframe subset is usually less than a data volume of a codebook corresponding to the preconfigured downlink subframe set, and no CRC needs to be added to the second codebook. Therefore, feedback is performed in the second feedback manner, thereby reducing system overheads. In addition, feedback is performed according to a preconfigured downlink subframe, so as to avoid a case in which the terminal provides incorrect feedback because of missed detection, thereby improving system reliability.

Examples of the present disclosure provide an information sending method, an information receiving method, and a device, so as to resolve a technical problem that system overheads are relatively high when UE feeds back an ACK/NACK corresponding to a downlink subframe to a base station.

According to a first aspect, an information sending method is provided, including:

determining, by a terminal, to send feedback information for a downlink subframe to a network device in a first feedback manner, where in the first feedback manner, a first codebook of the feedback information is corresponding to a downlink subframe in an instantly scheduled downlink subframe set, the instantly scheduled downlink subframe set includes the downlink subframe of the terminal that is actually scheduled by the network device, and the terminal is a terminal supporting CA; and sending, by the terminal, the feedback information to the network device in the first feedback manner.

With reference to the first aspect, in a first possible implementation of the first aspect, the method further includes:

determining, by the terminal according to a detected downlink control channel in the downlink subframe, the downlink subframe scheduled by the network device.

With reference to the first possible implementation of the first aspect, in a second possible implementation of the first aspect, the method further includes:

obtaining, by the terminal, an index field carried on the downlink control channel, where a value of the index field is a count value obtained by performing accumulative counting in a carrier-first and subframe-second order in the instantly scheduled downlink subframe set.

With reference to the second possible implementation of the first aspect, in a third possible implementation of the first aspect, the method further includes:

obtaining, by the terminal, a sum field carried on the downlink control channel, where the sum field is used to indicate a total quantity of scheduled downlink subframes of the terminal in the instantly scheduled downlink subframe set; or the sum field is used to indicate a total quantity of scheduled downlink subframes of the terminal in a downlink subframe set corresponding to a current downlink subframe number in the instantly scheduled downlink subframe set; or the sum field is used to indicate a total quantity of scheduled downlink subframes of the terminal in a downlink subframe set corresponding to a current downlink subframe number in the instantly scheduled downlink subframe set and in a downlink subframe set corresponding to subframe numbers of all downlink subframes before a subframe moment of the current downlink subframe number.

With reference to the third possible implementation of the first aspect, in a fourth possible implementation of the first aspect, the method further includes:

receiving, by the terminal, a first indication field delivered by the network device, where the first indication field carries a round quantity of cyclic value setting indicated by the index field, or the first indication field is used to indicate the total quantity of the scheduled downlink subframes of the terminal in the instantly scheduled downlink subframe set.

With reference to the second possible implementation of the first aspect, in a fifth possible implementation of the first aspect, the method further includes:

obtaining, by the terminal, a sum field carried on the downlink control channel, and receiving, by the terminal, a first indication field delivered by the network device, where the sum field and the first indication field are used to jointly indicate a total quantity of scheduled downlink subframes of the terminal in the instantly scheduled downlink subframe set, and a bit carried in the first indication field is a high-order bit.

With reference to any one of the first aspect, or the first to the third possible implementations of the first aspect, in a sixth possible implementation of the first aspect, before the determining, by a terminal, to send feedback information for a downlink subframe to a network device in a first feedback manner, the method further includes:

receiving, by the terminal, a first indication field delivered by the network device; and the determining, by a terminal, to send feedback information for a downlink subframe to a network device in a first feedback manner includes:

if the first indication field indicates first status information, determining, by the terminal, to send the feedback information to the network device in the first feedback manner corresponding to the first status information.

With reference to the sixth possible implementation of the first aspect, in a seventh possible implementation of the first aspect, the sending, by the terminal, the feedback information to the network device in the first feedback manner includes:

adding, by the terminal, a CRC to the obtained first codebook;

performing, by the terminal, channel coding on the feedback codebook to which the CRC is added, to obtain the feedback information; and sending, by the terminal, the feedback information to the network device.

With reference to any one of the fourth to the seventh possible implementations of the first aspect, in an eighth possible implementation of the first aspect, the first indication field is a field in a UL_grant.

With reference to the sixth possible implementation of the first aspect, in a ninth possible implementation of the first aspect, after the receiving, by the terminal, a first indication field delivered by the network device, the method further includes:

if the first indication field indicates second status information, determining, by the terminal, to send the feedback information for the downlink subframe to the network device in a second feedback manner corresponding to the second status information, where in the second feedback manner, a second codebook of the feedback information is corresponding to a downlink subframe in a preconfigured downlink subframe subset, the preconfigured downlink subframe subset is a subset of a preconfigured downlink subframe set, and the preconfigured downlink subframe set is configured for the terminal and includes all downlink subframes on all carriers corresponding to an uplink subframe carrying the feedback information; and sending, by the terminal, the feedback information to the network device in the second feedback manner.

According to a second aspect, an information receiving method is provided, including:

scheduling, by a network device, a downlink subframe of a terminal, where the terminal is a terminal supporting CA; and receiving, by the network device, feedback information sent by the terminal in a first feedback manner, where in the first feedback manner, a first codebook of the feedback information is corresponding to a downlink subframe in an instantly scheduled downlink subframe set, and the instantly scheduled downlink subframe set includes the downlink subframe of the terminal that is actually scheduled by the network device.

With reference to the second aspect, in a first possible implementation of the second aspect, the scheduling, by a network device, a downlink subframe of a terminal includes:

adding, by the network device, an index field to a downlink control channel in the downlink subframe, where a value of the index field is a count value obtained by performing accumulative counting in a carrier-first and subframe-second order in the instantly scheduled downlink subframe set.

With reference to the first possible implementation of the second aspect, in a second possible implementation of the second aspect, the scheduling, by a network device, a downlink subframe of a terminal further includes:

adding, by the network device, a sum field to the downlink control channel in the downlink subframe, where the sum field is used to indicate a total quantity of scheduled downlink subframes of the terminal in the instantly scheduled downlink subframe set; or the sum field is used to indicate a total quantity of scheduled downlink subframes of the terminal in a downlink subframe set corresponding to a current downlink subframe number in the instantly scheduled downlink subframe set; or the sum field is used to indicate a total quantity of scheduled downlink subframes of the terminal in a downlink subframe set corresponding to a current downlink subframe number in the instantly scheduled downlink subframe set and in a downlink subframe set corresponding to subframe numbers of all downlink subframes before a subframe moment of the current downlink subframe number.

With reference to the second possible implementation of the second aspect, in a third possible implementation of the second aspect, the scheduling, by a network device, a downlink subframe of a terminal further includes:

delivering, by the network device, a first indication field to the terminal, where the first indication field carries a round quantity of cyclic value setting indicated by the index field, or the first indication field is used to indicate the total quantity of the scheduled downlink subframes of the terminal in the instantly scheduled downlink subframe set.

With reference to the first possible implementation of the second aspect, in a fourth possible implementation of the second aspect, the scheduling, by a network device, a downlink subframe of a terminal further includes:

adding, by the network device, a sum field to the downlink control channel in the downlink subframe, and delivering a first indication field to the terminal, where the sum field and the first indication field are used to jointly indicate a total quantity of scheduled downlink subframes of the terminal in the instantly scheduled downlink subframe set, and a bit carried in the first indication field is a high-order bit.

With reference to any one of the second aspect, or the first to the second possible implementations of the second aspect, in a fifth possible implementation of the second aspect, the method further includes:

delivering, by the network device, a first indication field to the terminal; and the receiving, by the network device, feedback information sent by the terminal in a first feedback manner includes:

if the first indication field indicates first status information, receiving, by the network device, the feedback information sent by the terminal in the first feedback manner.

With reference to the fifth possible implementation of the second aspect, in a sixth possible implementation of the second aspect, after the delivering, by the network device, a first indication field to the terminal, the method further includes:

if the first indication field indicates second status information, receiving, by the network device, the feedback information sent by the terminal in a second feedback manner, where in the second feedback manner, a second codebook of the feedback information is corresponding to a downlink subframe in a preconfigured downlink subframe subset, the preconfigured downlink subframe subset is a subset of a preconfigured downlink subframe set, and the preconfigured downlink subframe set is configured for the terminal and includes all downlink subframes on all carriers corresponding to an uplink subframe carrying the feedback information.

With reference to any one of the third to the sixth possible implementations of the second aspect, in a seventh possible implementation of the second aspect, the first indication field is a field in a UL_grant.

According to a third aspect, a terminal is provided, including:

a processing module, configured to determine to send feedback information for a downlink subframe to a network device in a first feedback manner, where in the first feedback manner, a first codebook of the feedback information is corresponding to a downlink subframe in an instantly scheduled downlink subframe set, the instantly scheduled downlink subframe set includes the downlink subframe of the terminal that is actually scheduled by the network device, and the terminal is a terminal supporting CA; and a sending module, configured to send the feedback information to the network device in the first feedback manner.

With reference to the third aspect, in a first possible implementation of the third aspect, the processing module is further configured to:

determine, according to a detected downlink control channel in the downlink subframe, the downlink subframe scheduled by the network device.

With reference to the first possible implementation of the third aspect, in a second possible implementation of the third aspect, the processing module is further configured to:

obtain an index field carried on the downlink control channel, where a value of the index field is a count value obtained by performing accumulative counting in a carrier-first and subframe-second order in the instantly scheduled downlink subframe set.

With reference to the second possible implementation of the third aspect, in a third possible implementation of the third aspect, the processing module is further configured to:

obtain a sum field carried on the downlink control channel, where the sum field is used to indicate a total quantity of scheduled downlink subframes of the terminal in the instantly scheduled downlink subframe set; or the sum field is used to indicate a total quantity of scheduled downlink subframes of the terminal in a downlink subframe set corresponding to a current downlink subframe number in the instantly scheduled downlink subframe set; or the sum field is used to indicate a total quantity of scheduled downlink subframes of the terminal in a downlink subframe set corresponding to a current downlink subframe number in the instantly scheduled downlink subframe set and in a downlink subframe set corresponding to subframe numbers of all downlink subframes before a subframe moment of the current downlink subframe number.

With reference to the third possible implementation of the third aspect, in a fourth possible implementation of the third aspect, the terminal further includes a receiving module, configured to:

receive a first indication field delivered by the network device, where the first indication field carries a round quantity of cyclic value setting indicated by the index field, or the first indication field is used to indicate the total quantity of the scheduled downlink subframes of the terminal in the instantly scheduled downlink subframe set.

With reference to the second possible implementation of the third aspect, in a fifth possible implementation of the third aspect, the terminal further includes a receiving module;

the processing module is further configured to obtain a sum field carried on the downlink control channel, and the receiving module is configured to receive a first indication field delivered by the network device, where the sum field and the first indication field are used to jointly indicate a total quantity of scheduled downlink subframes of the terminal in the instantly scheduled downlink subframe set, and a bit carried in the first indication field is a high-order bit.

With reference to any one of the third aspect, or the first to the third possible implementations of the third aspect, in a sixth possible implementation of the third aspect, the terminal further includes a receiving module;

the receiving module is configured to: before the processing module determines to send the feedback information for the downlink subframe to the network device in the first feedback manner, receive a first indication field delivered by the network device; and the processing module is configured to: if the first indication field indicates first status information, determine to send the feedback information to the network device in the first feedback manner corresponding to the first status information.

With reference to the sixth possible implementation of the third aspect, in a seventh possible implementation of the third aspect, the sending module is configured to:

add a CRC to the obtained first codebook;

perform channel coding on the feedback codebook to which the CRC is added, to obtain the feedback information; and send the feedback information to the network device.

With reference to any one of the fourth to the seventh possible implementations of the third aspect, in an eighth possible implementation of the third aspect, the first indication field is a field in a UL_grant.

With reference to the sixth possible implementation of the third aspect, in a ninth possible implementation of the third aspect, the processing module is further configured to: after the receiving module receives the first indication field delivered by the network device, if the first indication field indicates second status information, determine to send the feedback information for the downlink subframe to the network device in a second feedback manner corresponding to the second status information, where in the second feedback manner, a second codebook of the feedback information is corresponding to a downlink subframe in a preconfigured downlink subframe subset, the preconfigured downlink subframe subset is a subset of a preconfigured downlink subframe set, and the preconfigured downlink subframe set is configured for the terminal and includes all downlink subframes on all carriers corresponding to an uplink subframe carrying the feedback information; and the sending module is further configured to send the feedback information to the network device in the second feedback manner.

According to a fourth aspect, a network device is provided, including:

a processing module, configured to schedule a downlink subframe of a terminal, where the terminal is a terminal supporting CA; and a receiving module, configured to receive feedback information sent by the terminal in a first feedback manner, where in the first feedback manner, a first codebook of the feedback information is corresponding to a downlink subframe in an instantly scheduled downlink subframe set, and the instantly scheduled downlink subframe set includes the downlink subframe of the terminal that is actually scheduled by the network device.

With reference to the fourth aspect, in a first possible implementation of the fourth aspect, the processing module is configured to:

add an index field to a downlink control channel in the downlink subframe, where a value of the index field is a count value obtained by performing accumulative counting in a carrier-first and subframe-second order in the instantly scheduled downlink subframe set.

With reference to the first possible implementation of the fourth aspect, in a second possible implementation of the fourth aspect, the processing module is configured to:

add a sum field to the downlink control channel in the downlink subframe, where the sum field is used to indicate a total quantity of scheduled downlink subframes of the terminal in the instantly scheduled downlink subframe set; or the sum field is used to indicate a total quantity of scheduled downlink subframes of the terminal in a downlink subframe set corresponding to a current downlink subframe number in the instantly scheduled downlink subframe set; or the sum field is used to indicate a total quantity of scheduled downlink subframes of the terminal in a downlink subframe set corresponding to a current downlink subframe number in the instantly scheduled downlink subframe set and in a downlink subframe set corresponding to subframe numbers of all downlink subframes before a subframe moment of the current downlink subframe number.

With reference to the second possible implementation of the fourth aspect, in a third possible implementation of the fourth aspect, the processing module is configured to:

deliver a first indication field to the terminal, where the first indication field carries a round quantity of cyclic value setting indicated by the index field, or the first indication field is used to indicate the total quantity of the scheduled downlink subframes of the terminal in the instantly scheduled downlink subframe set.

With reference to the first possible implementation of the fourth aspect, in a fourth possible implementation of the fourth aspect, the processing module is configured to:

add a sum field to the downlink control channel in the downlink subframe, and deliver a first indication field to the terminal, where the sum field and the first indication field are used to jointly indicate a total quantity of scheduled downlink subframes of the terminal in the instantly scheduled downlink subframe set, and a bit carried in the first indication field is a high-order bit.

With reference to any one of the fourth aspect, or the first to the second possible implementations of the fourth aspect, in a fifth possible implementation of the fourth aspect, the network device further includes a sending module;

the sending module is configured to deliver a first indication field to the terminal; and the receiving module is configured to: if the first indication field indicates first status information, receive the feedback information sent by the terminal in the first feedback manner.

With reference to the fifth possible implementation of the fourth aspect, in a sixth possible implementation of the fourth aspect, the receiving module is further configured to:

after the sending module delivers the first indication field to the terminal, if the first indication field indicates second status information, receive the feedback information sent by the terminal in a second feedback manner, where in the second feedback manner, a second codebook of the feedback information is corresponding to a downlink subframe in a preconfigured downlink subframe subset, the preconfigured downlink subframe subset is a subset of a preconfigured downlink subframe set, and the preconfigured downlink subframe set is configured for the terminal and includes all downlink subframes on all carriers corresponding to an uplink subframe carrying the feedback information.

With reference to any one of the third to the sixth possible implementations of the fourth aspect, in a seventh possible implementation of the fourth aspect, the first indication field is a field in a UL_grant.

In the examples of the present disclosure, the terminal may send the feedback information for the downlink subframe to the network device in the first feedback manner, that is, the first codebook of the feedback information is determined according to the instantly scheduled downlink subframe set. This is equivalent to the fact that the terminal performs feedback for the downlink subframe actually scheduled by the network device. In this way, information about a downlink subframe that is not actually scheduled by the network device does not need to be fed back, and a quantity of bits included in the first codebook is less than a quantity of bits that need to be fed back by the terminal, thereby greatly reducing system overheads.

It may be clearly understood by a person skilled in the art that, for the purpose of convenient and brief description, division of the foregoing function units is taken as an example for illustration. In actual application, the foregoing functions can be allocated to different function units and implemented according to a requirement, that is, an inner structure of an apparatus is divided into different function units to implement all or part of the functions described above. For a detailed working process of the foregoing system, apparatus, and unit, reference may be made to a corresponding process in the foregoing method examples, and details are not described herein again.

In the several examples provided in this application, it should be understood that the disclosed system, apparatus, and method may be implemented in other manners. For example, the described apparatus example is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the examples.

In addition, functional units in the examples of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the examples of this application. The foregoing storage medium includes: any medium that can store program code, such as a USB flash drive, a removable hard disk, a ROM, a RAM, a magnetic disk, or an optical disc.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

The foregoing examples are merely used to describe the technical solutions of this application. The foregoing examples are merely intended to help understand the method and core idea of the present disclosure, and shall not be construed as a limitation on the present disclosure. Any variation or replacement readily figured out by a person skilled in the art within the technical scope disclosed in the present disclosure shall fall within the protection scope of the present disclosure.

What is claimed is:

1. An information receiving method, comprising:
   scheduling, by a network device, a first downlink subframe in a downlink subframe set of a terminal;
   sending, by the network device, a sum field and a first indication field to the terminal; and
   receiving, by the network device, first feedback information in an uplink subframe for the first downlink subframe in the downlink subframe set;
   wherein:
   feedback information for each downlink subframe in the downlink subframe set is fed back in the uplink subframe,
   the first indication field indicates a total quantity of downlink subframes in the downlink subframe set, and
   the sum field indicates a total quantity of downlink subframes whose numbers are equal to the subframe number of the first downlink subframe and that are in the downlink subframe set, and downlink subframes before the first downlink subframe and that are in the downlink subframe set.

2. The method according to claim 1, further comprising:
   sending, by the network device, an index field on a downlink control channel, wherein a value of the index field is a count value obtained by performing accumulative counting in a carrier-first and subframe second order in the downlink subframe set.

3. The method according to claim 2, wherein the sum field is carried on the downlink control channel.

4. The method according to claim 1, wherein the first indication field is in an uplink scheduling grant (UL_grant).

5. The method according to claim 1, further comprising:
   sending, by the network device, an index field on a downlink control channel,
   wherein a value of the index field denotes an accumulative counting value of downlink subframes in the downlink subframe set, up to the first downlink subframe and a first carrier on which the first downlink subframe is located, first in increasing order of carrier number and then in increasing order of subframe number.

6. The method according to claim 1, wherein the downlink subframe set is a subset of a preconfigured downlink subframe set, and the preconfigured downlink subframe set is configured for the terminal and includes all downlink subframes on all carriers corresponding to the uplink subframe.

7. An apparatus, comprising:
   one or more processors, and
   a non-transitory storage medium configured to store program instructions that when executed by the one or more processors cause the apparatus to:
   schedule a first downlink subframe in a downlink subframe set of a terminal;
   send a sum field and a first indication field to the terminal; and
   receive first feedback information in an uplink subframe for the first downlink subframe in the downlink subframe set;
   wherein:
   feedback information for each downlink subframe in the downlink subframe set is to be fed back in the uplink subframe,
   the first indication field indicates a total quantity of downlink subframes in the downlink subframe set, and
   the sum field indicates a total quantity of downlink subframes whose numbers are equal to the subframe number of the first downlink subframe and that are in the downlink subframe set, and downlink subframes before the first downlink subframe and that are in the downlink subframe set.

8. The apparatus according to claim 7, wherein the program instructions further cause the apparatus to:
   send an index field on a downlink control channel, wherein a value of the index field is a count value obtained by performing accumulative counting in a carrier-first and subframe second order in the downlink subframe set.

9. The apparatus according to claim 8, wherein the sum field is carried on the downlink control channel.

10. The apparatus according to claim 7, wherein the first indication field is in an uplink scheduling grant (UL_grant).

11. The apparatus according to claim 7, wherein the program instructions further cause the apparatus to:
send an index field on a downlink control channel,
wherein a value of the index field denotes an accumulative counting value of downlink subframes in the downlink subframe set, up to the first downlink subframe and a first carrier on which the first downlink subframe is located, first in increasing order of carrier number and then in increasing order of subframe number.

12. The apparatus according to claim 7, wherein the downlink subframe set is a subset of a preconfigured downlink subframe set, and the preconfigured downlink subframe set is configured for the terminal and includes all downlink subframes on all carriers corresponding to the uplink subframe.

13. A non-transitory computer-readable medium having program instructions recorded thereon, wherein, when the instructions are executed by a processor in a network device, the instructions cause the network device to:
schedule a first downlink subframe in a downlink subframe set of a terminal;
send a sum field and a first indication field to the terminal; and
receive first feedback information in an uplink subframe for the first downlink subframe in the downlink subframe set;
wherein:
feedback information for each downlink subframe in the downlink subframe set is to be fed back in the uplink subframe,
the first indication field indicates a total quantity of downlink subframes in the downlink subframe set, and
the sum field indicates a total quantity of downlink subframes whose numbers are equal to the subframe number of the first downlink subframe and that are in the downlink subframe set, and downlink subframes before the first downlink subframe and that are in the downlink subframe set.

14. The apparatus according to claim 13, wherein the instructions further cause the network device to:
send an index field on a downlink control channel, wherein a value of the index field is a count value obtained by performing accumulative counting in a carrier-first and subframe second order in the downlink subframe set.

15. The non-transitory computer-readable medium according to claim 14, wherein the sum field is carried on the downlink control channel.

16. The non-transitory computer-readable medium according to claim 13, wherein the first indication field is in an uplink scheduling grant (UL_grant).

17. The non-transitory computer-readable medium according to claim 13, wherein the instructions further cause the network device to:
send an index field on a downlink control channel,
wherein a value of the index field denotes an accumulative counting value of downlink subframes in the downlink subframe set, up to the first downlink subframe and a first carrier on which the first downlink subframe is located, first in increasing order of carrier number and then in increasing order of subframe number.

18. The non-transitory computer-readable medium according to claim 13, wherein the downlink subframe set is a subset of a preconfigured downlink subframe set, and the preconfigured downlink subframe set is configured for the terminal and includes all downlink subframes on all carriers corresponding to the uplink subframe.

* * * * *

UNITED STATES PATENT AND TRADEMARK OFFICE
CERTIFICATE OF CORRECTION

| | |
|---|---|
| PATENT NO. | : 10,873,417 B2 |
| APPLICATION NO. | : 16/684251 |
| DATED | : December 22, 2020 |
| INVENTOR(S) | : Guan et al. |

It is certified that error appears in the above-identified patent and that said Letters Patent is hereby corrected as shown below:

On the Title Page

Item [63], Related U.S. Application Data: "Continuation of application No. 15/895,896" should read -- Continuation of application No. 15/895,826 --.

Signed and Sealed this
Thirty-first Day of May, 2022

Katherine Kelly Vidal
*Director of the United States Patent and Trademark Office*